(12) United States Patent
Hawwa et al.

(10) Patent No.: US 9,228,919 B1
(45) Date of Patent: Jan. 5, 2016

(54) SYSTEM FOR LEAK DETECTION IN PIPELINES BY OPTICAL MEANS

(71) Applicant: King Fahd University of Petroleum and Minerals, Dhahran (SA)

(72) Inventors: Muhammad A. Hawwa, Dhahran (SA); Uthman Baroudi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/579,523

(22) Filed: Dec. 22, 2014

(51) Int. Cl.
*G01N 15/02* (2006.01)
*G01M 3/38* (2006.01)
*G01M 3/02* (2006.01)

(52) U.S. Cl.
CPC .. *G01M 3/38* (2013.01); *G01M 3/02* (2013.01)

(58) Field of Classification Search
CPC ................................ G01N 15/02; G01N 21/00

USPC ............................................................ 356/338
See application file for complete search history.

(56) References Cited

U.S. PATENT DOCUMENTS

| 3,754,275 | A  | * | 8/1973  | Carter    | G01N 29/30 |
|-----------|----|---|---------|-----------|------------|
|           |    |   |         |           | 324/220    |
| 2003/0210390 | A1 | * | 11/2003 | O'Mahony | A61M 1/1692 |
|           |    |   |         |           | 356/218    |

* cited by examiner

*Primary Examiner* — Roy M Punnoose
(74) *Attorney, Agent, or Firm* — Oblon, McClelland, Maier & Neustadt, L.L.P.

(57) ABSTRACT

Optical methods and systems for the detection of leakages in fluid transporting pipelines. An exemplary system comprises at least one pair of light transmitter and light sensor positioned at the pipe wall itself. The discontinuity of fluid flow by bubbles and entrained particles resulting from a crack on the pipe wall is reflected in the light rays received by the light sensor. The discontinuity is recorded and converted into an optical signal that is transmitted wirelessly to a processing unit at a receiving station.

8 Claims, 6 Drawing Sheets

SYSTEM FOR LEAK DETECTION IN PIPELINES BY OPTICAL MEANS

BACKGROUND OF THE INVENTION

1. Technical Field

The present invention relates to methods and systems for the detection of leakage in fluid pipelines. More specifically, the present invention relates to optical methods and systems to detect such leakages.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Extensive pipeline networks are relied upon for the transportation and delivery of water. One major problem frequently encountered by engineers and municipal authorities is water leakage from these water pipelines. There are several reasons for water to leak from a pipeline, for example, loose pipe fittings, damage from excessive fluid pressure and corrosion caused by reactions with the moving fluid or a surrounding medium. Globally and especially in arid regions, water is a scarce resource and desalination of sea water is widely pursued in order to cope with the demand of growing populations and to support expanding economies. Hence, it is very important to detect pipeline leakages since they may present serious environmental and economic problems. Current pipeline monitoring systems lack responsiveness and often report the problem only after significant amounts of fluid have been spilled.

The pressure built within a pipeline of flowing water is mainly attributed to pumping. When a pipe leaks, it causes a sudden drop in pressure, and the pressure fluctuation sends an acoustical signal in both upstream and downstream directions. Acoustics-based methods have been conventionally used by engineers to detect pipeline leakages. Microphones and/or hydrophones are used to pick up sounds generated by leaking fluids. Cross-correlations of two signals from the two upstream and downstream measuring points provide distance measurements of the leak from the measuring points and thus, the location of the leak can be determined by calculations.

Another acoustic method of leak detection is the utilization of ultrasonic signals. In one scenario, an ultrasonic wave is sent in the pipe walls and the incidental wave is scattered when it encounters a discontinuity (leak domain). The transmitted or reflected ultrasonic wave is measured to indicate the type of discontinuity encountered. In another scenario, an ultrasonic signal is generated by a transmitter and sent across the pipe. The ultrasonic signal is then received by a transducer to examine the signal's distortion, which is an indicator of any entrainment due to leakage.

Other electromagnetic and optical fiber-based methods have also been employed to detect leakages in water pipeline systems. Each method comes with its respective pros and cons.

Optical methods have been utilized for the detection of natural gas leakage from pipes. Various optical systems based on monitoring light absorption or scattering of emitted radiation have been described, including light detection and ranging (LIDAR) systems (Minato A, Joarder M, Ozawa S, Kadoya M, Sugimoto N, 1999. Development of a LIDAR system for measuring methane using a gas correlation method. Jpn J Appl Phys Part 1 38(10): 6130-6132—incorporated herein by reference in its entirety), diode laser absorption system (Iseki T, Tai H, Kimura K, 2000. A portable remote methane sensor using a tunable diode laser. Measurement Science and Technology 11: 594—incorporated herein by reference in its entirety), $CO_2$ laser backscatter imaging systems (Kasai N, Tsuchiya C, Fukuda, T, Sekine K, Sano T, Takehana T, 2011. Propane gas leak detection by infrared adsorption using carbon infrared emitter and infrared camera. NDT and E International 44(1): 57-60; Kulp T, Kennedy R, Delong M, Garvis M, Stahovec J, 1993. The development and testing of a backscatter absorption gas imaging system capable of imaging at a range of 300 m. Applied Laser Radar Technology, Proc. Soc. Photo-Opt. Instrum. Eng 1936: 204-212—each incorporated herein by reference in its entirety) and broadband absorption systems (Spaeth L, O'Brien M, 2003. An additional tool for integrity monitoring. Pipeline and gas journal 230(3): 41—incorporated herein by reference in its entirety).

The use of multiple techniques for the detection of water leakage in pipelines can provide more reliable results leading to a more accurate engineering decision. It will be desirable to combine different leak systems based upon different principles of physics. Therefore, it becomes necessary to design methods and systems other than the aforementioned acoustic, ultrasonic, electromagnetic and optical fiber-based methods and systems that can accurately detect leakages in water pipeline systems and are efficient in terms of response time, sensitivity, robustness and cost.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, the present invention relates to a system for leakage detection in a fluid-transporting pipeline comprising at least one light transmitter positioned at a first inner wall of the pipeline, at least one light sensor positioned at a second inner wall of the pipeline and aligned with the light transmitter to detect and receive light rays emitted by the light transmitter, a converter connected to the light sensor to convert light rays received by the light sensor into a digitized optical signal, a wireless transmitter connected to the converter and a computerized processing unit that receives the digitized optical signal from the wireless transmitter. Interference and scattering of the emitted light rays by bubbles and/or entrained particles resulting from a leakage is detected and received by the light sensor. The digitized optical signal is processed and analyzed by the computerized processing unit to determine the location of the leakage. In one embodiment, the first and second inner walls are opposite of each other and the light sensor is downstream of the light transmitter. In one embodiment, the system further comprises at least one reflective mirror positioned at any of the first and second inner walls.

In a second aspect, the present invention relates to a method of detecting a leakage in a fluid-transporting pipeline comprising: positioning at least one light transmitter at a first inner wall of the pipeline, positioning at least light sensor at a second inner wall of the pipeline and aligning the light sensor with the light transmitter to detect and receive light rays emitted by the light transmitter, connecting the light sensor to a converter to convert light rays received by the light sensor into a digitized optical signal, connecting the converter to a wireless transmitter to send the digitized optical signal to a computerized processing unit and processing and analyzing the digitized optical signal with the computerized processing unit to determine the location of the leakage. In one embodiment, the method further comprises positioning at least one reflective mirror at any of the first and second inner walls to reflect the light rays emitted by the light transmitter before the light rays are detected an received by the light sensor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
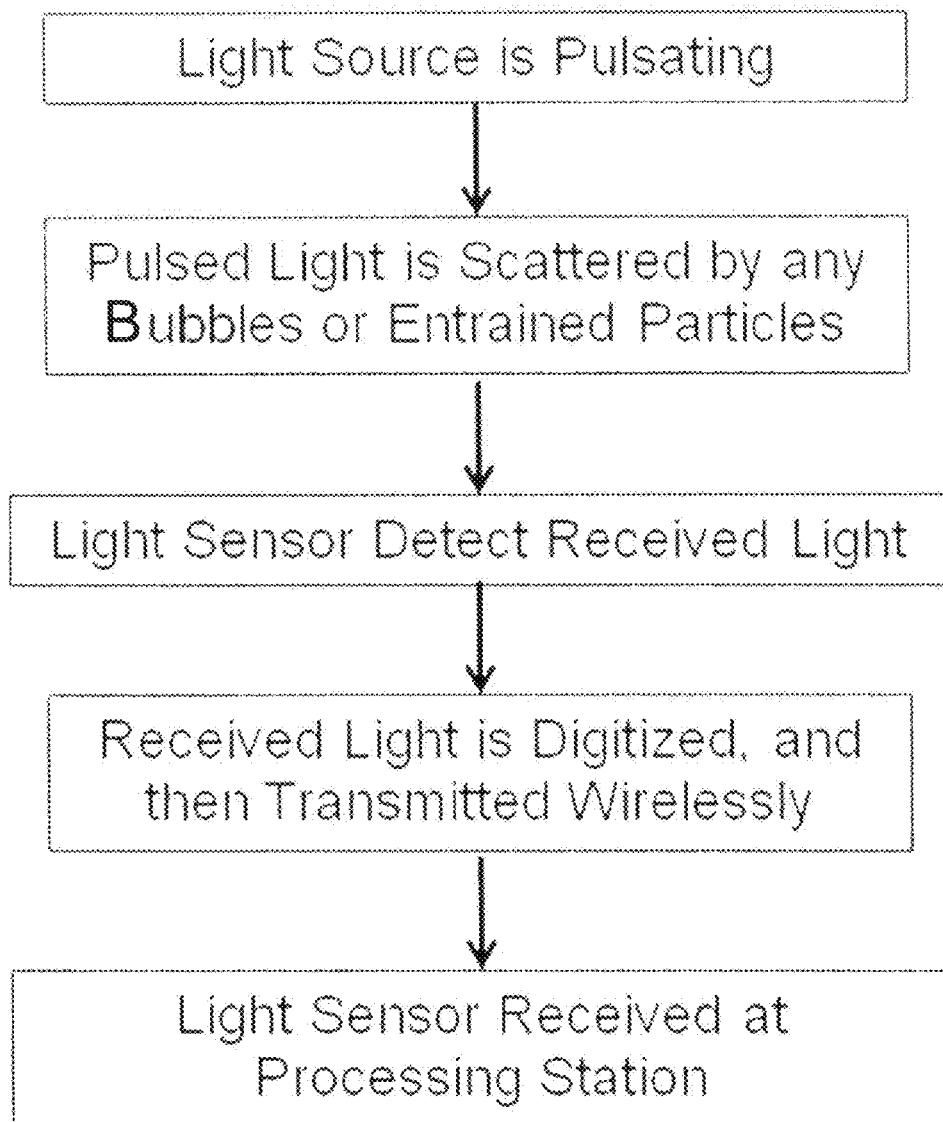
FIG. 1 is a flowchart diagram outlining the operational steps of the optical system of leakage detection in a fluid pipe according to the present invention.

Referring now to the drawings, wherein like reference numerals designate identical or corresponding parts throughout the several views.

The present invention pertains to optical methods and systems for the detection of leakage in fluid pipeline systems. Examples of fluids include water, an aqueous solution and chemical fluids. These methods and systems are based upon the fact that a crack in the wall of a fluid pipe would result in formation of bubbles that would in turn stimulate entrained particles in the flowing fluid, causing a discontinuity in flow fluid. The operational steps of these methods and systems are summarized in the flowchart of FIG. 1. A light transmitter is included in the design of an exemplary leakage detection system within a pipe. The light transmitter sends pulsating light rays into the flowing fluid. Pulsating (or pulsed, or flashing) light is a rhythmic light in which the total duration of the light in each period is clearly shorter than the total duration of the darkness and in which the flashes of light are all of equal duration. Pulsating or pulsed light rays are within wavelength ranges of 450-590 nm, preferably 495-570 nm (green light), more preferably 450-495 nm (blue light). The pulsating light rays are delivered in short bursts wherein the on/off time of each pulse of light is about 2 microseconds. Preferably, each pulse of light is from 0.1 to 10 microseconds, more preferably from 0.5 to 5 microseconds, even more preferably from 1 to 4 microseconds. A delay between the pulses may range from millisecond to seconds. Preferably, the duration or delay between pulses is a factor of 5 to 100 times the period of the pulse. More preferably, the delay of from 10 to 20 times the length of the pulse. The delay and length of the pulse can be adjusted as necessary.

During a leakage, a crack in the wall of the pipe forms bubbles and stimulates other entrained particles in the flowing fluid, causing a discontinuity in fluid flow. The pulsed light rays are scattered by the bubbles and entrained particles and a light sensor detects and receives the remaining unscattered light rays. The received light rays are digitized into a digitized sensed optical signal that is then transmitted wirelessly to a receiving station that is equipped with a processing unit such as a computer for data processing.

FIGS. 2-5 offer visualizations of the optical-based leakage detection system as well as various embodiments thereof. As seen in FIGS. 2-5, fluid transporting pipe 200 that has a generally elongated, cylindrical shape includes inner walls 202, 204 that are directly opposite each other. Pipe 200 may be made of metal or plastic, for example, polyvinyl chloride. Pipe 200 may have a diameter of 16 in to 32 in, for example, 24 in (61 cm) or 32 in (81 cm). Both inner walls 202, 204 have generally flat and smooth surfaces to keep friction and corrosion to a minimum. During transportation, fluid flows in one direction, 206, as indicated by the pair of block arrows. Light transmitter 208 is positioned at inner wall 202, as shown in FIGS. 2-5. In one embodiment, light transmitter 208 may be positioned at the inner wall 202 during the manufacturing of the pipe 200. Light transmitter 208 is in a flush position at inner wall 202, being at the edge of inner wall 202 and in direct contact with the flow of the fluid but not extending into the pipe and interfering with the flow. In another embodiment, the light transmitter may be recessed into the pipe wall. Alternatively, the light transmitter may be set into a cavity that passes through the width of the pipe wall.

The light transmitter 208 may be a pump laser, laser diode or a ferruled optical fiber, a pulsed light transmitter and may include screws, nails, bolts, nuts or other equivalent fasteners to affix the device to the wall.

Figure 2:
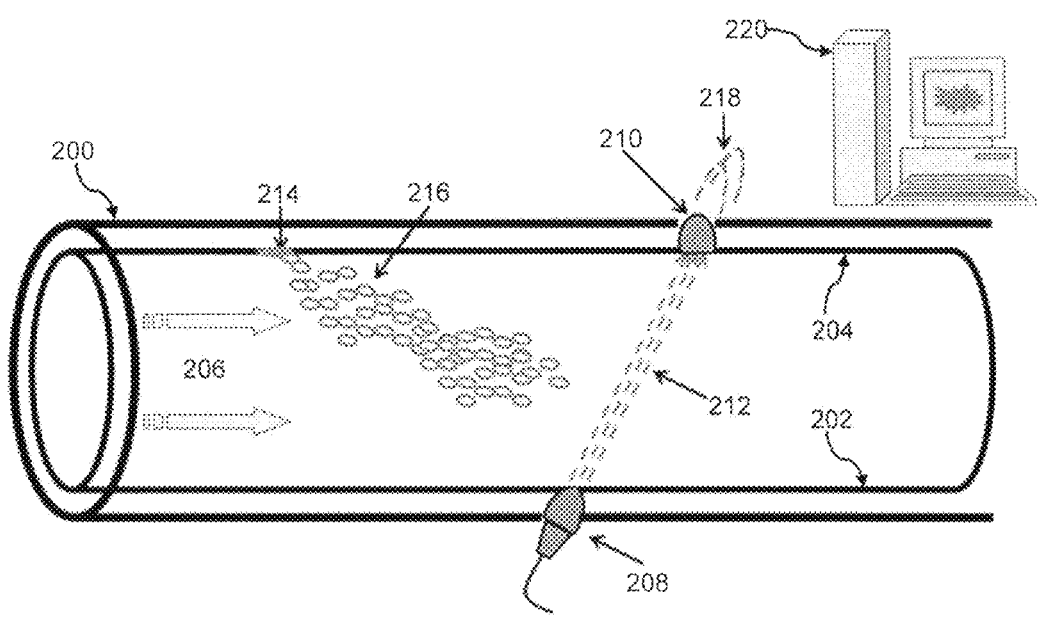
FIG. 2 illustrates the positioning of a light transmitter at the wall of a fluid pipe.
Figure 3:
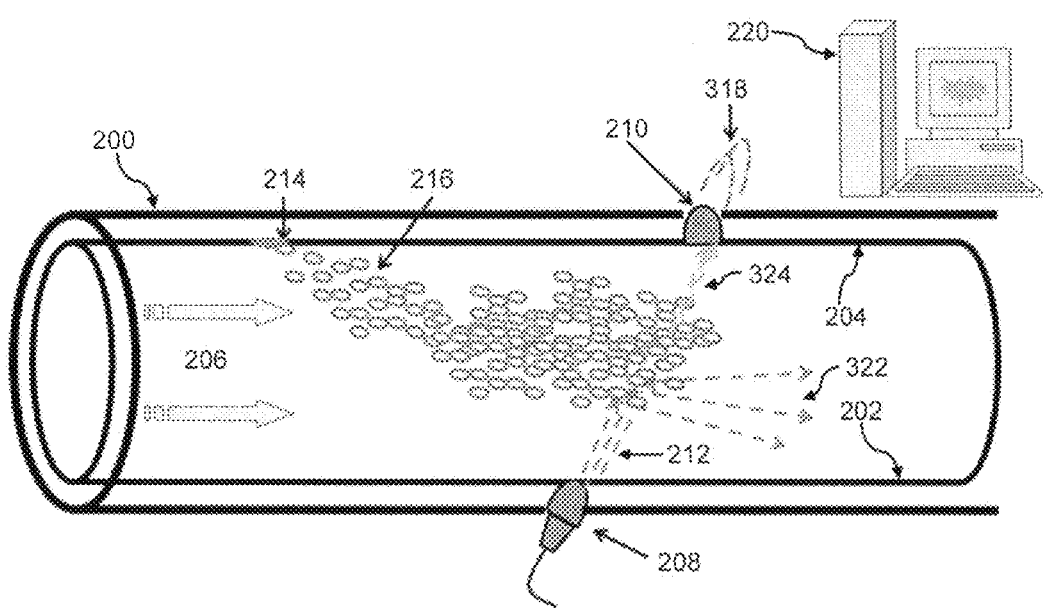
FIG. 3 illustrates the processing of a received signal at the processing unit.

In one embodiment, as depicted in FIGS. 2 and 3, light sensor 210 may be positioned inner wall 204. Like light transmitter 208, light sensor 210 is in a flush position wherein no part of the device extends into pipe 200. In another embodiment, the light sensor may be recessed into the pipe wall. Alternatively, the light sensor may be set into a cavity that passes through the width of the pipe wall. Light sensor 210 may include fasteners such as screws, nails, bolts, nuts or other equivalent fasteners to affix the device to wall 204. Light sensor 210 may be perpendicularly or diagonally opposite light transmitter 208; however, the distance between the two components has to be aligned so that light sensor 210 is sensitive enough to detect and receive unscattered light rays. Preferably, like the light transmitter, the light sensor 210 is positioned at inner wall 204 during the manufacturing of pipe 200.

Still referring to FIGS. 2 and 3, a crack is created at point 214 during a leakage incident. The crack results in the formation of air bubbles and/or stimulation of entrained particles 216 across the flowing fluid from point 214 onward. As seen in FIG. 2, before the bubbles and/or entrained particles reach where light transmitter 208 is installed, pulsating light rays 212 travel directly across the flowing water to light sensor 210. Light sensor is linked to an analog-to-digital converter (not shown) which is connected to a wireless transmitter (not shown) that sends a default digitized sensed optical signal to processing unit 220 at a receiving station for signal and data processing. When the bubbles and/or entrained particles interfere with pulsating light rays 212 (see FIG. 3), it causes some of the rays to be scattered, thus forming scattered light rays 322 while unscattered light rays 324 travel through the bubbles and entrained particles to light sensor 210. In a similar manner, the unscattered light rays are detected and received by light sensor 210 and a digitized optical signal 318 (this time weaker than when no leakage is present) is sent to the processing unit. Alternatively, signal processing can be partially executed internally with a processor installed at pipe 200 adjacent to light sensor 210 in order to minimize energy consumption.

For purposes of the present invention, an "analog-to-digital converter", "ADC" or "converter" is a device that converts an electronic signal or a continuous physical quantity (usually analog current or voltage) to a digital number that represents the quantity's amplitude. The conversion involves quantization or signal processing of the input. Instead of performing a single conversion, an analog-to-digital converter often samples the input and performs multiple conversions periodically. An ADC according to the present invention may have a resolution of 8-bit to 12-bit, a sampling rate of 50-100 Msps and a bandwidth of 100 kHz to 8 MHz. Methods may further include calibration procedures for all embodiments of the present invention wherein the converter is calibrated with a range of default values for optical signals for a specific type of fluid when there is no leakage in a pipe, as well as values for optical signals received from different leakage points. Threshold values may be set for the converter so that the device and/or the processing unit at the receiving station recognize them immediately and emit an alert signal to civil engineers and municipal authorities.

In a pipeline network, multiple light transmitter-light sensor pairs may be installed especially at segments that are more susceptible to cracks and leakages so that they can be continuously monitored. Based on the collective readings from these multiple light transmitter-light receiver pairs, a centralized, external processing unit receiving these optical signals wirelessly can then localize precisely the leakage point.

Methods and systems described herein may be readily combined with other techniques and systems of water leakage detection, such as acoustic, ultrasonic, electromagnetic and optical fiber-based systems.

Figure 4:
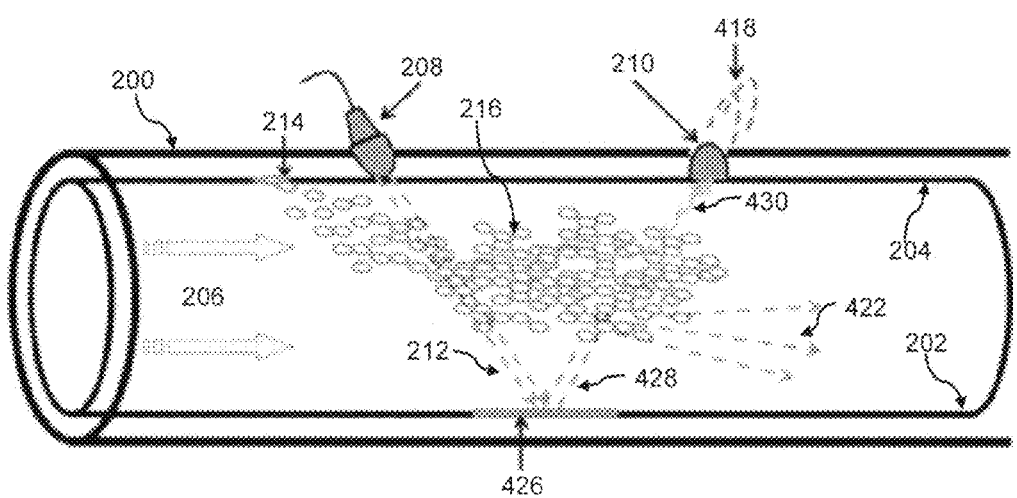
FIG. 4 illustrates the arrangement of the light transmitter, a mirror for a V-shaped reflection of the light rays.
Figure 5:
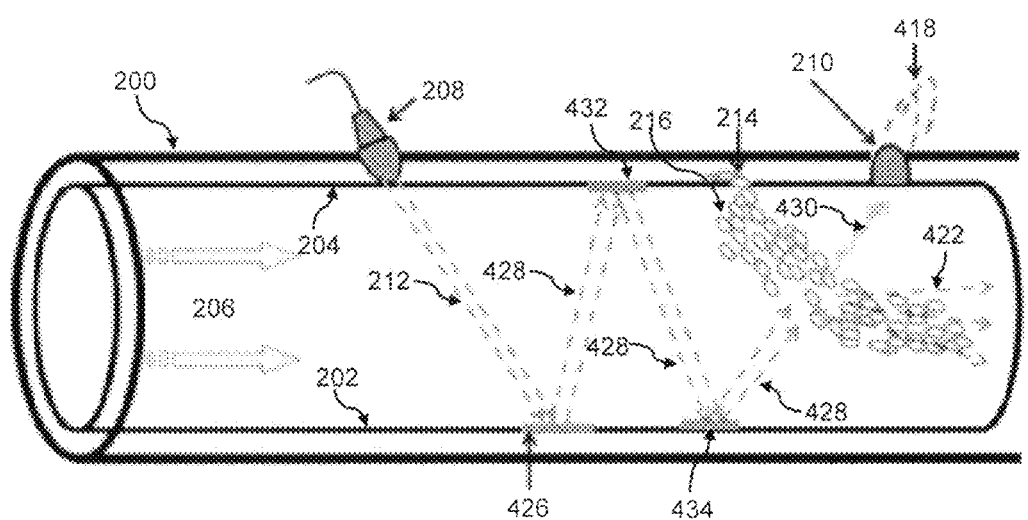
FIG. 5 illustrates the arrangement of the light transmitter and mirrors for a W-shaped reflection of the light rays.

In an alternative embodiment, as shown in FIGS. 4 and 5, light transmitter 208 and light sensor 210 pair may be positioned at the same inner wall (202 or 204) and located on the same side. FIG. 4 illustrates a V-optical arrangement of the leakage detection system wherein light transmitter 208 and light sensor 210 are both positioned at inner wall 204. Light sensor 210 is disposed downstream of light transmitter 208. A reflective mirror 426 is positioned at the opposite inner wall 202 between light transmitter 208 and light sensor 210. Pulsating light rays 212 from light transmitter 208 travel through bubbles and/or entrained particles 216 from leakage point 214. The pulsating light rays are then reflected by mirror 426 as reflective light rays 428. The transmission of reflective light rays 428 is disrupted by bubbles and/or entrained particles 216, resulting in scattered light rays 422. Unscattered light rays 430 continue to travel to light sensor 210 and as previously described, a digitized optical signal 418 is transmitted wirelessly to the processing unit.

FIG. 5 illustrates a W-optical arrangement of the leakage detection system according to yet another embodiment of the present invention. In this embodiment, light transmitter 208 and light sensor 210 pair are also located on the same side on or in the same inner wall (202 or 204). Three reflective mirrors 426, 432 and 434 are positioned between light transmitter 208 and light sensor 210. As seen in FIG. 5, the three mirrors are arranged in an alternate pattern in inner walls 202 and 204, so that the transmission of the pulsating, reflective and unscattered light rays may create a W-shape. For example, first and third mirrors 426, 434 may be positioned at inner wall 202 while second mirror 432 may be positioned at inner wall 204 between the first and third mirror.

FIG. 5 also illustrates one advantage of the V- and W-optical arrangements as leakage point may precede light transmitter 208 or otherwise. In other words, due to the placement of at least one reflective mirrors and thus reflecting the pulsating light rays from the light transmitter, water leakage detection systems adopting the V- or W-optical arrangements are able to cover a greater length of the water pipe. This may effectively reduce the number of light transmitter-light sensor pairs that is required to be installed along the pipeline.

Reflective mirrors in the above V- and W-optical arrangements increase the distance light from the light emitter travels through fluid in the pipeline, therefore increasing or extending the coverage of each light transmitter-light sensor pair in the leak detection system. For example, without reflective mirrors, a light transmitter-light sensor pair in an exemplary leak detection system may cover distances of 1 m to 10 m. Reflective mirrors may extend the distance coverage to $10^2$ m, for example, 100 m, 250 m or 500 m.

Reflective pairs of counter-facing mirrors may be positioned along a pipeline wall according to a distance that corresponds with a pipeline dimension. Reflection of light inside the pipe is ideally arranged so that the light path through the fluid is maximized to provide greatest sensitivity for leak detection. Counter-facing mirrors may be spaced laterally at distances that are equivalent to the pipe diameter. For example, a pipe having a diameter of 20 inches may include a plurality of counter-facing mirrors which are positioned laterally down the axis of the pipe with each counter-facing mirror located downstream from the immediate opposing mirror down the axis of the pipeline at a distance that is equivalent to the inner or outer diameter of the pipe. Mirrors can also be positioned laterally down the pipe axis against a pipeline wall such that immediately neighboring counter-facing mirrors are separated by distances represented as multiples of the inner or outer pipeline diameter.

In another embodiment mirrors are polished into the surface of the metal pipeline prior to installation and operation of the pipeline. A mirrored surface may circumferentially cover the entire inner surface of a pipe around a circumference of defined width in a belt-like fashion. Sections of standardized pipe which are delivered with mirrored belt-like surfaces present prior to installation can be set at certain distances in a pipeline. For example, a 10 m section of pipe having one or more mirrored circumferential surfaces polished therein can appear for every 100 m, 1000 m, 2000 m, 5000 m or 10,000 m of pipeline length. Such pre-polished surfaces may be especially useful to aid in internal pipeline inspection. For example, a remotely controlled vehicle or pig may be inserted into a pipeline and travel laterally to inspect pipeline quality. Such a device can be positioned at or near a pre-polished surface and emit light on the pre-polished surface a basis for detecting leaks.

Selected embodiments may further include optical filters and optical signal amplifiers in the leak detection systems.

Figure 6:
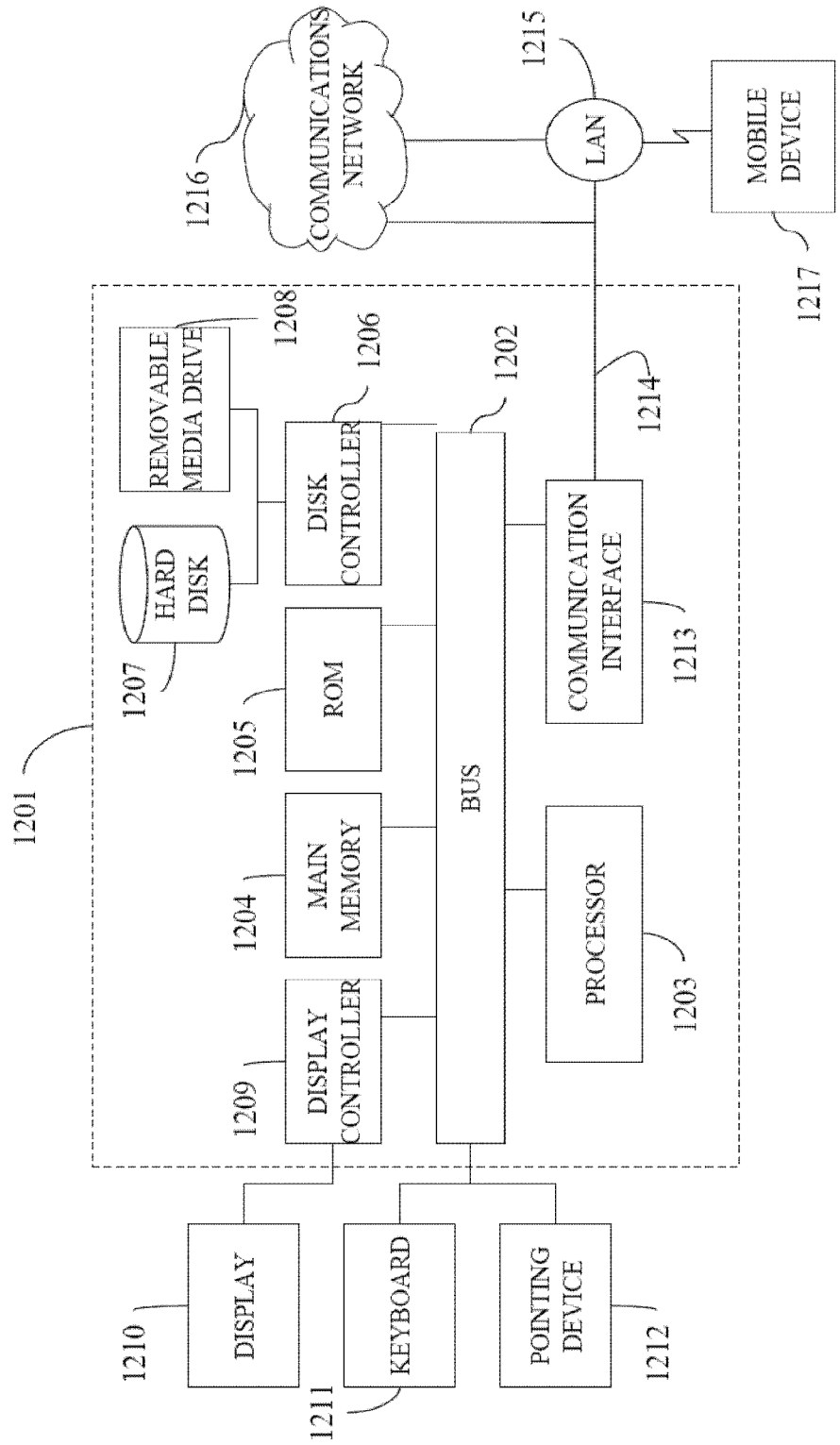
FIG. 6 illustrates an exemplary computer system for data processing, analysis and calculations to determine the location of a leakage.

FIG. 6 illustrates an exemplary computer system 1201 upon which data processing, analysis and calculations to determine the location of a leakage point, after the wireless transmission of an optical signal, may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for leakage detection in a fluid-transporting pipeline, comprising:
   at least one pulse light transmitter positioned at a first location on an inner wall of the pipeline;
   at least one light sensor positioned at a second location on the inner wall of the pipeline and aligned with the light transmitter to detect and receive light rays emitted by the light transmitter;
   a converter connected to the light sensor to convert light rays received by the light sensor into a digitized optical signal;
   a wireless transmitter connected to the converter; and,
   a computerized processing unit that receives the digitized optical signal from the wireless transmitter;
   wherein interference and scattering of the emitted light rays by bubbles and/or entrained particles resulting from a leakage is detected and received by the light sensor; and,
   wherein the computerized processing unit processes and analyzes the digitized optical signal to determine the location of the leakage.

2. The system of claim 1, wherein the first and second inner walls are opposite of each other.

3. The system of claim 1, wherein the light sensor is downstream of the light transmitter.

4. The system of claim 1, further comprising at least one reflective mirror positioned at any of the first and second inner walls.

5. A method of detecting a leakage in a fluid-transporting pipeline, comprising:
   (a) positioning at least one pulse light transmitter at a first location on an inner wall of the pipeline;
   (b) positioning at least one light sensor at a second location on the inner wall of the pipeline and aligning the light sensor with the light transmitter to detect and receive light rays emitted by the light transmitter;
   (c) connecting the light sensor to a converter to convert light rays received by the light sensor into a digitized optical signal;
   (d) connecting the converter to a wireless transmitter to send the digitized optical signal to a computerized processing unit; and,
   (e) processing and analyzing the digitized optical signal with the computerized processing unit to determine the location of the leakage;
   wherein interference and scattering of the emitted light rays by bubbles and/or entrained particles resulting from the leakage is detected and received by the light sensor.

6. The method of claim 5, wherein the first and second inner walls are opposite of each other.

7. The method of claim 5, wherein the light sensor is downstream of the light transmitter.

8. The method of claim 5, further comprising:
   (f) positioning at least one reflective mirror at any of the first and second inner walls to reflect the light rays emitted by the light transmitter before the light rays are detected an received by the light sensor.

* * * * *